US008595266B2

(12) United States Patent
Barbieri et al.

(10) Patent No.: US 8,595,266 B2
(45) Date of Patent: Nov. 26, 2013

(54) METHOD OF SUGGESTING ACCOMPANIMENT TRACKS FOR SYNCHRONISED RENDERING WITH A CONTENT DATA ITEM

(75) Inventors: Mauro Barbieri, Eindhoven (NL); Johannes Weda, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 399 days.

(21) Appl. No.: 12/812,968

(22) PCT Filed: Jan. 15, 2009

(86) PCT No.: PCT/IB2009/050139
§ 371 (c)(1),
(2), (4) Date: Jul. 15, 2010

(87) PCT Pub. No.: WO2009/093153
PCT Pub. Date: Jul. 30, 2009

(65) Prior Publication Data
US 2010/0299344 A1    Nov. 25, 2010

(30) Foreign Application Priority Data
Jan. 22, 2008    (EP) .................................... 08150473

(51) Int. Cl.
*G06F 17/30* (2006.01)
(52) U.S. Cl.
USPC ............................ 707/803; 707/793; 707/741
(58) Field of Classification Search
None
See application file for complete search history.

(56) References Cited

U.S. PATENT DOCUMENTS

| 7,239,348 B2 | 7/2007 | Miyazaki | |
| 2005/0004985 A1* | 1/2005 | Stochosky | 709/205 |
| 2005/0057578 A1 | 3/2005 | Chen et al. | |
| 2005/0288991 A1* | 12/2005 | Hubbard et al. | 705/10 |
| 2006/0020880 A1* | 1/2006 | Chen | 715/500.1 |
| 2007/0118910 A1* | 5/2007 | Taylor | 726/27 |
| 2007/0156790 A1* | 7/2007 | Sun Hsu et al. | 707/204 |
| 2009/0024592 A1* | 1/2009 | Lazarski et al. | 707/3 |

FOREIGN PATENT DOCUMENTS

WO    2007057850 A2    5/2007

OTHER PUBLICATIONS

Kaji et al: "A Music Recommendation System Based on Annotations About Listeners Preferences and Situations"; First International Conference on Automated Production of Cross Media Content for Multi-Channel Distribution (AXMEDIS), Nov. 2005, IEEE, pp. 231-234.
Huang et al: "An Audio Recommendation System Based on Audio Signature Description Scheme in MPEG-7 Audio"; 2004 IEEE International Conference on Multimedia and Expo (ICME), Jun. 2004, vol. 1, pp. 639-642.
Blanco-Fernandez et al:"A Multi-Agent Open Architecture for a TV Recommender System: A Case Study Using a Bayesian Strategy"; Proceedings of the IEEE Sixth International Symposium on Multimedia Software Engineering (ISMSE '04), pp. 178-185.

* cited by examiner

*Primary Examiner* — Syed Hasan

(57) ABSTRACT

A method of suggesting accompaniment tracks for synchronised rendering with a content data item includes obtaining data descriptive of the content data item. A database query based at least partly on the data descriptive of the content data item to identify auxiliary content items to a user is resolved. The database (14;28) includes records, each configured to associate descriptive data with an auxiliary content data item for forming an accompaniment track. Data representative of a selection of an auxiliary content data item is received in association with the query, and a database record for the selected auxiliary content data item is caused to be amended to reflect the selection in association with at least part of the descriptive data included in the query.

17 Claims, 3 Drawing Sheets

METHOD OF SUGGESTING ACCOMPANIMENT TRACKS FOR SYNCHRONISED RENDERING WITH A CONTENT DATA ITEM

FIELD OF THE INVENTION

The invention relates to a method of suggesting auxiliary content data items for forming accompaniment tracks for synchronised rendering with a content data item.

The invention also relates to a method of obtaining an accompaniment track for rendering in synchrony with a content data item.

The invention also relates to a system for suggesting auxiliary content data items for forming accompaniment tracks for synchronised rendering with a content data item.

The invention also relates to a computer programme.

BACKGROUND OF THE INVENTION

WO 2007/057850 discloses a method for using content metadata associated with a sequence of at least one image to provide audio accompaniment therefor, comprising the steps of locating matching audio accompaniments in a database, using the content metadata associated with the sequence, and providing the located audio accompaniment as accompaniment for the sequence. In a preferred embodiment, digital image content and characteristics provided by a user are used to derive textual labels (image metadata), which can be a keyphrase comprising at least one keyword derived from a user-specified image name/label or a keyphrase derived from a textual annotation of the image. An audio accompaniment database is provided that has been previously annotated (indexed) with standardised audio accompaniment metadata. An image metadata capture/creation module receives an image, an image sequence and metadata describing the image and the image sequence. The metadata input by the user is captured by the module as well as created by the module through image analysis. A search/association module searches a database for suitable audio accompaniments based on the metadata, and a suggestion/play module at least suggests a playlist or plays a most relevant audio accompaniment resulting from the search.

The known method is static: it is based on previous indexing, usually by a relatively small group of test persons—and is more difficult to implement for types of accompaniment other than audio accompaniments comprising songs with lyrics.

SUMMARY OF THE INVENTION

It is an object of the invention to provide methods, a system and a computer programme of the types mentioned above in the opening paragraphs that enable generally more satisfactory recommendations to be provided to users, thereby avoiding repeated user queries.

This object is achieved according to the invention by providing a method of suggesting auxiliary content data items for forming accompaniment tracks for synchronised rendering with a content data item, including
obtaining input data descriptive of the content data item;
accessing a database including records, each configured to associate descriptive data with an auxiliary content data item for forming an accompaniment track;
receiving data representative of a selection of an auxiliary content data item from amongst a plurality of auxiliary content data items presented for selection; and
causing a database record for the selected auxiliary content data item to be amended to reflect the selection in association with descriptive data based on at least part of the input data.

By causing a database record for the selected content item to be amended to reflect the selection in association with at least part of the descriptive data, the database evolves, as do the results of resolving a particular query. Users may contribute to perfecting the database, in that data is received that is representative of a selection on behalf of a user of a content item in association with descriptive data such as might be comprised in a query of the database. Because the evolution of the database is thus founded on multiple contributions from users, the quality of association between descriptive data and candidate content items for forming accompaniment tracks improves with use. A further effect of making use of the contributions is that the method is independent of the types of content item for forming accompaniment tracks with which the method is implemented. The association between descriptive data and content items in the database is shaped by the users and/or devices operated by them, rather than being based primarily on content analysis. This makes the method suitable for use with e.g. scripts for an ambient system. In that example, it is not known very well why people have particular associations with particular aspects of their environments (colour and strength of ambient lighting conditions, for example). The method also provides better results where the predominant associations with content items are based on collective experience rather than some inherent property of the content item. For example, many people associate the song "Candle in the wind" performed by Elton John at the funeral of Diana, Princess of Wales, with the latter. This is not an association that could be predicted when the song was first recorded, or indeed an association that finds basis in the lyrics or melody of the song.

It is observed that recommendation systems are known, e.g. in the context of Internet shopping systems such as those provided by Amazon, Inc. Such systems use user profiles to suggest to other users items that they might like to purchase. The methods involved in these systems do not, amongst others, comprise causing a database record for a selected item to be amended to reflect the selection in association with at least part of descriptive data included in input data descriptive of a content data item.

In an embodiment of the method, wherein the descriptive data includes tags,
amendment of the database record for the selected auxiliary content data item includes amending statistics stored in association with each individual one of at least one of the tags.

An effect is that statistics are kept on the number of times a particular tag has been used to describe a particular auxiliary content data item. This information can be used by an automated system to suggest auxiliary content data items most often described by descriptive data in a query by a user or multiple users.

An embodiment of the method includes receiving data representative of a selection of a sub-section of the selected auxiliary content data item, and
causing a record in the database associated with the selected auxiliary content data item to be amended to reflect the selection of the sub-section.

An effect is that prior analysis of the auxiliary content data items, either using artificial intelligence systems or a panel of expert users, is not required to populate the database. The incorporation of data identifying sub-sections of the auxiliary content data items in the database is a collaborative effort by users. A further effect is that information is obtained as to which parts of the auxiliary content data items are most expressive of the properties indicated in the descriptive data.

An embodiment of the method includes:

forming a database query based at least partly on the input data;

causing the database query to be resolved; and receiving the data representative of the selection of an auxiliary content data item in response to presenting a plurality of auxiliary content data items for selection based on results of the database query.

An effect is that a relatively efficient method of configuring the suggestion system is provided, in particular for updating the database. There is no requirement for a separate "learning phase", in which users provide input purely for the sake of improving the quality of the database. Instead, the database contents are improved as the database is being queried to provide meaningful results to users. A database query based at least partly on data descriptive of the content data item is used automatically to enhance the information in the database. Thus, this feedback results in a dynamically developing suggestion system. In particular, because the method is suitable for obtaining associations between descriptive data and auxiliary content data items based on collective experience, judgment and/or knowledge, rather than an analytical algorithm, dynamic development allows for the accuracy of the database to be maintained.

According to another aspect, the method of obtaining an accompaniment track for rendering in synchrony with a content data item according to the invention includes:

forming a query based at least partly on data for describing the content data item;

submitting the query to a system for searching a database, the database including records, each configured to associate descriptive data with an auxiliary content data item for forming an accompaniment track, and at least one record reflecting at least one previous selection of the associated auxiliary content data item in association with at least part of the descriptive data included in the record; and obtaining data representative of an auxiliary content data item for forming the accompaniment track, based at least partly on results of the query.

The method can be implemented by a client application using a remote system for searching a remote database, for example. An effect of the method is that use is made of information in a database suitable for being updated with information regarding which auxiliary content data items are described best by which data.

An embodiment includes receiving information identifying a plurality of auxiliary content data items in response to submitting the query, and allowing a user to select the auxiliary content data item from amongst the plurality of auxiliary content data items.

An effect is that the submission of repeated queries is prevented, as users attempt to provide the most appropriate descriptive data. By returning a plurality of auxiliary content data items, the likelihood that an appropriate one is returned is increased.

In an embodiment of the method, the query is formed at least partly on the basis of data indicative of a duration of at least part of the content data item, when rendered, and the query is submitted to a system for searching a database, associating data representative of at least one duration with each of a plurality of the auxiliary content data items.

An effect is the limitation of the choice of auxiliary content data items or sections thereof to those with an appropriate length for forming an accompaniment track. Crude truncation can be avoided. The method is able to limit the suggestions provided to auxiliary content data items of which a section of generally similar length to that of the content data item that is to receive an accompaniment can be provided. It is noted that the data representative of at least one duration associated with each of a plurality of auxiliary content data items could comprise data identifying particular points in the auxiliary content data item, from which durations of time intervals between points can be deduced. For example, the data can identify the start and end point of choruses.

An embodiment of the method includes forming the accompaniment track by selecting a sub-section of the auxiliary content data item selected in association with the query.

An effect is that it is avoided that the length of the assembly of content data item and accompaniment track increases to beyond the length of the content data item, at least when rendered. Within the constraint imposed by the length of the content data item, the range of appropriate auxiliary content data items for forming accompaniment tracks is increased by allowing the selection of a sub-section. In particular variants of this embodiment, a record in the database associated with the selected auxiliary content data item is caused to be amended to reflect the selection of the sub-section. An effect is that an update takes place of the database with information as to which sections of auxiliary content data items are considered most informative and/or appropriate for accompanying content data items when rendered in synchrony.

An embodiment of the method includes:

identifying at least one further content data item comprising information similar to the content item, obtaining data descriptive of at least one of the further content data items, wherein the query is formed at least partly on the basis of the data descriptive of at least one of the further content data items.

An effect is that the range of auxiliary content data items considered for forming accompaniment tracks are improved, in particular where a relatively sparse set of descriptive data is provided at first instance, or indeed none at all. The further content data item(s) may be identified through intrinsic content analysis, for example.

An embodiment includes obtaining additional information, wherein the query is formed at least partly on the basis of the additional information, and wherein the query is submitted to a system for searching a database including records associating auxiliary content data items with information of a type corresponding to that of the additional information.

An effect is that more control can be exercised over the search process.

A variant of this embodiment includes obtaining data identifying at least one of a user and a type of user, and retrieving the additional information from a database associating information of a corresponding type with at least one profile of at least one user.

An effect is that with the content data item an auxiliary content data item is combined comprising information that, when rendered perceptible, is perceived to be in harmony with the information content of the content data item by a targeted audience of a particular cultural background.

According to another aspect, the system according to the invention for suggesting auxiliary content data items for forming accompaniment tracks for synchronised rendering with a content data item, includes:

an interface for receiving input data descriptive of the content data item;

a processing system for accessing a database including records, each record being configured to associate descriptive data with an auxiliary content data item for forming an accompaniment track; and an interface for receiving data representative of a selection of an auxiliary content data item from among a plurality of auxiliary content data items presented for selection, wherein the system is adapted to cause a database record for the selected auxiliary content data item to be amended to reflect the selection in association with descriptive data based on at least part of the input data.

In an embodiment, the system is configured to carry out a method of configuring a system for suggesting auxiliary content data items for forming accompaniment tracks and/or a method of obtaining an accompaniment track for rendering in synchrony with a content data item according to the invention.

According to another aspect of the invention, there is provided a computer programme including a set of instructions capable, when incorporated in a machine-readable medium, of causing a system having information processing capabilities to perform a method according to the invention.

BRIEF DESCRIPTION OF THE DRAWINGS

The invention will be described with reference to the accompanying drawings, in which.

DETAILED DESCRIPTION OF THE EMBODIMENTS

Figure 1:
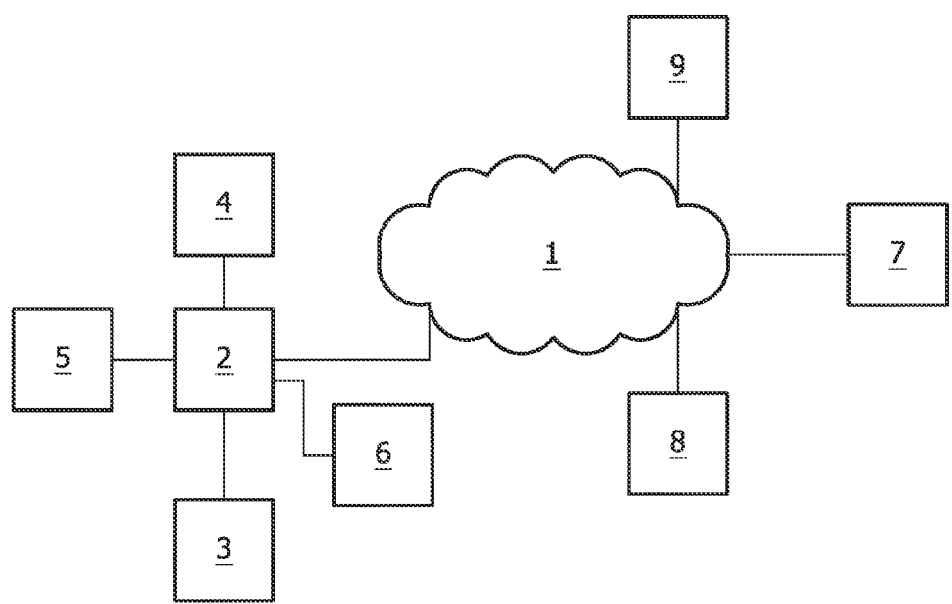
FIG. 1 is a schematic diagram of a networked system for adding accompaniment tracks to content data items.

Users create and manage more and more multimedia content such as digital photographs, videos and audio tracks. Some of these are user-created, such as those obtained using digital still cameras, video camera recorders and mobile phones, or created using software applications, for example. Some of these are downloaded over the Internet or taken from recording media. Software products, web services and consumer devices for rendering the content generally allow adding background music to enhance the user experience. Other rendering systems include ambient systems that allow adding scripts executed by the ambient system to enhance the experience. The ambient system may, for example, adjust the background lighting strength and/or colour in the environment of the rendering system, or it may provide vibration or other tactile effects.

There will be described herein ways of enhancing the aforementioned processes by means of which auxiliary content data items, such as audio data, data representative of scripts or settings for ambient systems are selected, edited and combined as accompaniment tracks with the main content data. These enhanced methods are configured to suggest the most appropriate auxiliary content data items (the term used to describe the source of data on which the accompaniment tracks are based). In the following, it will be assumed that the main content data comprises image data, e.g. a sequence of images in the form of a slide show or a video of finite duration, at least when rendered at a certain rate.

To achieve good results, the methods are implemented generally in a system including a network 1, e.g. a Large Area Network such as the Internet. A client device 2 is connected to the network 1. The client device 2 is a data processing device such as a personal computer, a media player (portable or otherwise), a home entertainment system or a similar system. In the example, it is provided with a user input device 3 for obtaining user input, e.g. a keyboard, pointer device or a combination of the two. It is also provided with a screen 4 for rendering the main content data, i.e. the slide show or video. A further output device 5 allows for information comprised in the accompaniment track to be rendered perceptible. The output device 5 can be an audio system, an ambient lighting system, a system for providing tactile feedback ("rumbler") or a similar device. In the illustrated embodiment, the client device 2 is also provided with a read-/write unit 6 for recording the main content data item as a signal synchronised with a signal representing the accompaniment track to a storage medium and/or for reading the main content data item from such a storage medium. The storage medium can be an optical disk or a magnetic disk or tape, for example.

First and second auxiliary content data servers 7,8 form locations at which auxiliary content data items available for download by the client device 2 are stored in one embodiment.

A suggestion server 9 is provided to determine which of a plurality of auxiliary content data items should be suggested to a user as appropriate for forming an accompaniment track for rendering with a particular main content data item. The suggestion server 9 is, in certain embodiments, also configured to store auxiliary content data items available for download by the client device 2.

Figure 2:
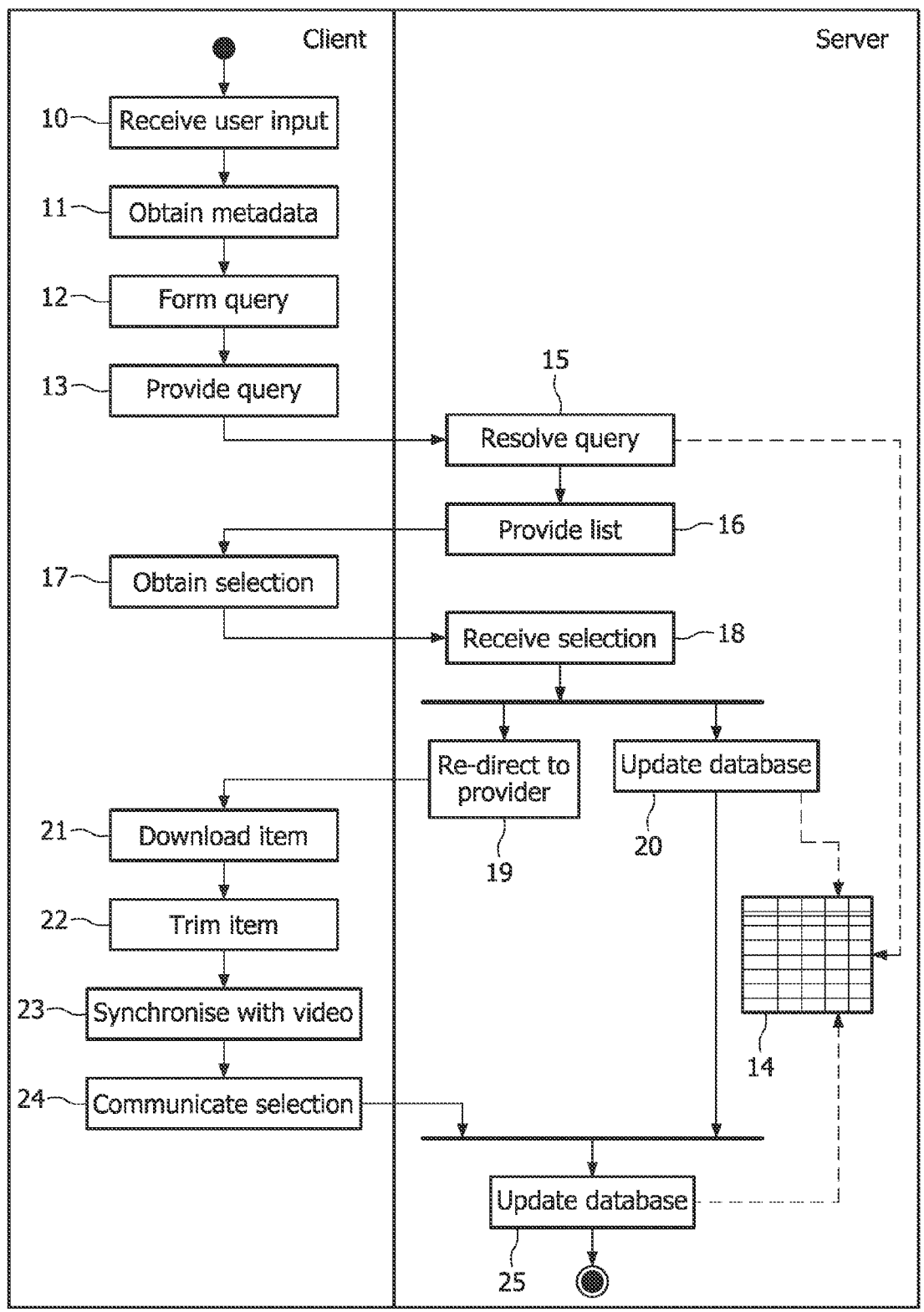
FIG. 2 is a flow chart showing an embodiment of a method that may be implemented by co-operating clients and a server to provide the clients with accompaniment tracks.

Referring to FIG. 2, in a first of two main variants to be described, the client device 2 is configured with an appropriate application for obtaining an accompaniment track for rendering in synchrony with a content data item, and it does so in co-operation with a server application run on the suggestion server 9. In one embodiment, the client application is comprised in a suite of video editing software. In another embodiment, it is comprised in a code for interpretation by a virtual machine.

In a first step 10, the client application receives user input provided using the user input device 3. The user input comprises at least an instruction to obtain an auxiliary content data item or to obtain an accompaniment track based on an auxiliary content data item. In certain embodiments, the user input further comprises additional information representative of at least one criterion for selecting auxiliary content data items. In an embodiment in which the operators of the auxiliary content data servers 7,8 charge for providing auxiliary content data items for download, the additional information may include data representative of a price or price range. In another embodiment, the additional information can include information representative of a desired source of the auxiliary content data items (e.g. one or more of the client device 2, suggestion server 9, first auxiliary content data server 7 and second auxiliary content data server 8). In another embodiment, the additional information includes information representative of a particular type of system for rendering the auxiliary content data in perceptible form, e.g. whether the user desires an audio track in mono, stereo, surround sound, etc., or whether the user desires a script for a particular type of ambient system. In another embodiment, the additional information includes information representative of characteristics of the auxiliary content data item, or a section thereof, at least when rendered. Examples include, in the case of audio information, the desired tempo or whether it should be orchestral or include lyrics. In the case of a script for an ambient system, the information can specify whether it should be for a dynamic or a static ambience, for example.

In a particular embodiment, the first step 10 includes obtaining data identifying at least one of at least one user and at least one type of user. The step is then followed by the step of retrieving the additional information from a database associating information representative of selection criteria with at least one profile of a user. The profile can be a generic user profile, incidentally. In one variant, the first step 10 comprises the step of receiving the user's log-on credentials via an operating system of the client device 2. In another embodiment, the user is prompted for a personal identifier (optionally in combination with a password) local to the system implemented by the system formed by means of the application on the client device 2 and the suggestion server 9. In another embodiment, the user is provided with means for specifying the target audience, either in terms of specific identifiable users known to the client device and/or the suggestion server 9 or in terms of generic user profiles. The user can, for instance, specify the nationality, gender or native language of the target audience. The client device 2 in one embodiment forms an aggregate user profile based on a plurality of specified user profiles.

In a particular embodiment, the duration of the main content data item is not fixed. An example is the case of a slide show, where the time between slide transitions can vary. In such embodiments, the first step 10 will generally include receiving data representative of a desired duration of the main content data item, when rendered.

In a next step 11, the client application obtains data descriptive of the main content data item. Implementations of this step 11 can vary. In one embodiment, the data descriptive of the main content data is retrieved from metadata recorded in association with the main content data item, e.g. in the form of tags having a pre-determined format. This will generally be appropriate where the main content data item is not user-generated. The data retrieved from metadata recorded in association with the main content data item can be any one or more of manual annotations, geographical co-ordinates, file name, title and sub-titles, for example. Generally, the metadata includes data that describes characteristics of content data items to aid in the identification, discovery, assessment and management of the described content data items. Tags are individual items of metadata, generally comprised of descriptive phrases (i.e. text data).

In another embodiment, the data descriptive of the main content data item is additionally or alternatively obtained from user input provided by means of the user input device 3. In such an embodiment, the user input may be free text. In another embodiment, the user input may be a selection of pre-determined tags. In another embodiment, it may be a combination of the two. In a particular variant, a thesaurus is used to provide suggestions of tags or keywords responsive to free text received as input from the user.

Based on metadata and duration in particular, and optionally any additional criteria specified in the first step 10, a query is created (step 12) by the client device 2. The query includes data descriptive of the main content data item, as well as the additional information, such as style, mood, type of event to which the main content data item relates, language, duration, tempo, price, etc.

In the illustrated embodiment, the query is communicated (step 13) to the suggestion server 9, which receives the data descriptive of the main content data item over the network 1.

The suggestion server 9 resolves (step 15) the query into a database 14 maintained by it. The database 14 includes records, represented by rows in the table shown in FIG. 2, associating descriptive data with an identification of an auxiliary content data item. In one example, at least one tag is associated with each auxiliary content data item. Each tag is further associated with data representative of the number of times the auxiliary content data item concerned has been selected by a user using that tag. Thus, statistics are stored in association with the tags.

In addition, the database 14 associates data representative of at least one duration with each of at least some of the auxiliary content data items represented in the database 14. This data can be in the form of a total duration of the auxiliary content data item. It can also be in the form of data representative of the length of one or more time intervals defined on the total duration of the auxiliary content data item, e.g. the duration of the chorus of a song and/or that of a particularly remarkable extract. In another embodiment, the data comprises a set of points, forming start and/or end points within the auxiliary content data item. In the illustrated embodiment, at least part of this data is obtained on the basis of user input, as will be explained below.

The step 15 of resolving the query includes resolving the query of the database 14 based at least partly on the data descriptive of the main content data item and partly on the data indicative of a duration of at least part of the main content data item (or a content data item forming part of the main content data item), when the latter is rendered at a certain rate. The results are further filtered by the suggestion server 9 based on the additional information included in the query. In an embodiment, the results are ranked, for example in accordance with the statistics stored in association with the tags and the identified auxiliary content data items in the database 14. The end-result is a list, that is communicated to the client device 2 (step 16). In an embodiment, the list includes an identification of the auxiliary content data items, rather than the actual data comprised in them. In another embodiment, it includes extracts or a sample.

The list of results returned by the suggestion server 9 is presented to the user by the application on the client device 2. The user chooses the sound or ambient system track according to his or her preferences. In an alternative embodiment, the user trims the selected auxiliary content data item to the length required at this stage. In the illustrated embodiment, the trimming occurs later.

Having obtained the selection 17, the client device 2 causes the database record for the selected auxiliary content data item to be updated by communicating (step 13) the selection to the suggestion server 9.

The suggestion server 9 receives the data representative of the selection (step 18). In the illustrated embodiment, it re-directs the selection request to one of the auxiliary content data item servers 7,8. In this embodiment, the user receives free suggestions for sounds and ambient system tracks that best fit his or her content, and is provided with the opportunity to buy or license the tracks. In an alternative embodiment, no re-directing via the suggestion server 9 takes place, but the list provided in the preceding step 16 includes links, e.g. HTML links, to the auxiliary content data item servers 7,8. Users pay the track providers, and the owner of the suggestion server 9 receives a percentage of the transactions. In this way, the operator of the suggestion server 9 acts as a broker between users and track providers. Track providers have an additional means to reach potential customers and increase sales. Users have a tool that is free at first instance for finding auxiliary content data items that best fit their main content data item.

In order for the database 14 to evolve—a means for enabling the suggestion server 9 to "learn"—the database record for the selected auxiliary content data item is updated to reflect the selection in association with at least part of the descriptive data included in the query. Thus, if the query included the tag "wedding", and this tag was associated with the auxiliary content data item, then the count of selections in the record associated with that particular content data item is increased. As more and more people use the tag "wedding" to describe the auxiliary content data item, the count is increased, ensuring that it will feature more prominently amongst the results of future queries including "wedding" as descriptive data.

In the illustrated embodiment, the user of the client device 2 downloads (step 21) the selected auxiliary content data item from one of the two auxiliary content data item servers 7,8. Then, the application allows the user to trim (step 22) the auxiliary content data item to the appropriate length, e.g. to match the length of the main content data item. The resulting accompaniment track is synchronised (step 23) with the main content data item, in the sense that they are both stored in the form of data having a common time base. The selection of start and/or end points comprised in the step 22 of trimming the auxiliary content data item is communicated (step 24) to the suggestion server 9. The suggestion server 9 updates (step 25) the database 14 by amending the record associated with the selected auxiliary content data item so as to reflect the selection of a sub-section thereof. In one embodiment, the selection is matched to pre-defined trimming points, and statistics associated with the pre-defined trimming points are updated. Thus, it is possible to store data indicating which sub-section most users consider to represent e.g. the chorus of a song.

Figure 3:
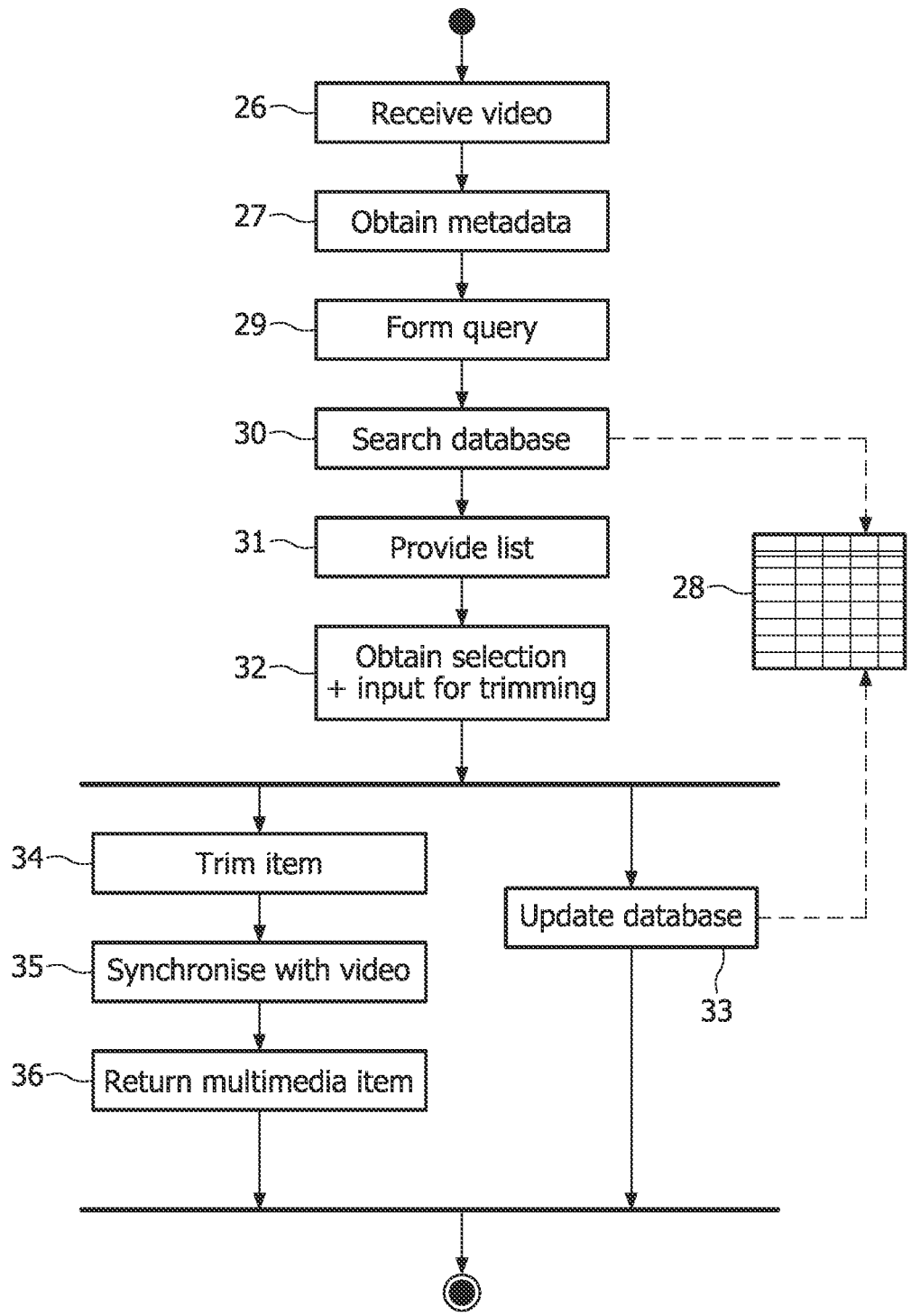
FIG. 3 is a flow chart showing another embodiment of a method, implemented by a server providing accompaniment tracks as a service over a network.

FIG. 3 illustrates an embodiment of a method of suggesting accompaniment tracks for synchronised rendering with a main content data item, and of a method of obtaining such an accompaniment track. The method is carried out by the suggestion server 9, and can be implemented without special adaptations on the client side. In particular, the client device 2 can be a personal computer equipped with a web browser. The suggestion server 9 provides a web interface.

In the illustrated embodiment, the suggestion server 9 receives (step 26) a video file over the network 1, which video file corresponds to a main content data item to be provided with an accompaniment track. In an alternative embodiment, this step 26 is replaced by a step of receiving an identification of the video data, for example, its title.

Next, data descriptive of the video is obtained (step 27). This step corresponds to the second step 11 of the method illustrated in FIG. 2. Thus, in one embodiment, the data descriptive of the main content data item is retrieved from metadata recorded in association with the main content data item, e.g. in the form of tags having a pre-determined format, and can include manual annotations, geographical co-ordinates, file name, title and sub-titles. In another embodiment, the data descriptive of the main content data item is additionally or alternatively obtained from user input provided through an appropriate part of the web interface provided by the suggestion server 9. In one such embodiment, the user input is free text. In another embodiment, the user input is a selection of pre-determined tags. In yet another embodiment, it is a combination of the two. In a particular variant, a thesaurus is used to provide suggestions of tags or keywords responsive to free text received as input from the user.

An additional step (not shown) of obtaining additional information on which to base a database query can be added to the illustrated method. This step would correspond to the first step 10 of the method of FIG. 2. Thus, the additional information may include data representative of a price or price range. In another embodiment, the additional information can include information representative of a desired source of the auxiliary content data items (e.g. one or more of the client device 2, suggestion server 9, first auxiliary content data server 7 and second auxiliary content data server 8). In another embodiment, the additional information includes information representative of a particular type of system for rendering the auxiliary content data in perceptible form, e.g. whether the user desires an audio track in mono, stereo, surround sound, etc., or whether the user desires a script for a particular type of ambient system. In another embodiment, the additional information includes information representative of characteristics of the auxiliary content data item, or a section thereof, at least when rendered. Examples include, in the case of audio information, the desired tempo or whether it should be orchestral or include lyrics. In the case of a script for an ambient system, the information can specify whether it should be for a dynamic or a static ambience, for example.

In a particular embodiment, data identifying at least one of at least one user and at least one type of user is obtained. The step is then followed by the step of retrieving the additional information from a database associating information representative of selection criteria with at least one profile of a user. The profile can be a generic user profile, incidentally. In another embodiment, the user is provided with means for specifying the target audience, either in terms of specific identifiable users known to the client device and/or the suggestion server 9 or in terms of generic user profiles.

In a particular embodiment, data representative of a desired duration of the main content data item, when rendered, is provided separately by the user.

Returning to the particular illustrated embodiment of FIG. 3, a query for searching a database 28 corresponding exactly to the database 14 of FIG. 2 is formed (step 29). The query is based at least partly on the data descriptive of the video obtained in the preceding step 27. It is also based partly on data indicative of the duration of the video, when rendered. This data is retrieved from the video data itself, or from data submitted by the user.

In a particular embodiment, at least one further video is identified comprising information similar to the video file received in the first step 26. Data descriptive of the further video or videos is also obtained, and used in the step 29 of formulating the database query. Similar videos can be identified on the basis of at least one of content analysis and metadata recorded in association with the videos. Thus, for example, an action film can be identified on the basis of metadata in the form of tags, or by identifying video sequences with rapid shot changes. An effect is that, if a user A has selected a track $S_1$ for his video $V_1$ and user B has shot a video $V_2$ that is very similar to video $V_1$ (e.g. both are wedding videos), then, even if tags describing $V_1$ and tags describing $V_2$ do not match perfectly, the suggestion server 9 can still recommend track $S_1$ to user B, when provided with that user's video $V_2$.

The search of the database 28 is carried out (step 30) next. The database 28 corresponds to the database 14 of FIG. 2. It includes records configured to associate descriptive data with auxiliary content data items. The descriptive data comprises tags, stored in association with statistics reflecting usage of the tags to obtain suggestions of auxiliary content data items and selection of the particular auxiliary content data item to which the statistic pertains. The database 28 further includes data indicative of a duration of at least a sub-section of the auxiliary content data item, when rendered at a certain rate, e.g. in the form of popular trimming points stored in association with statistics reflecting selection of the trimming points by users. The database 28 also associates additional information with auxiliary content data items, e.g. category information, language information, etc.

Having resolved the database query, the suggestion server 9 presents (step 31) a list of identified auxiliary content data items.

In the illustrated embodiment, the user may also indicate start and end points of a sub-section of the selected auxiliary content data item. To this end, a graphical representation of a time bar may be provided for instance. Alternatively, the user may select from pre-determined trimming points presented to him or her.

Both the selection of the trimming points and the selection of the auxiliary content data items are used to cause a database record for the selected auxiliary content data item to be updated (step 33) to reflect the selections. In particular, statistics associated with the auxiliary content data item are updated and/or tags are added to the record maintained for it (if the data obtained in the second step 27 included tags used for the first time in a query resulting in the selection of that auxiliary content data item).

The suggestion server 9 obtains the selected auxiliary content data item and trims it to the indicated length (step 34). Then (step 35), it is synchronised with the submitted video, and the completed multimedia file is returned to the user (step 36), e.g. by being made available for download or recorded on a medium sent to the user by post.

It should be noted that the embodiments described above illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In an embodiment, the selection of one of a list of suggested auxiliary content data items is provided implicitly, e.g. by a re-ordering of the list. In another embodiment, all auxiliary content data items identified as a result of the database query are provided to the user, e.g. in the form of a playlist comprising links to network locations from which they can be obtained. It is noted that such a playlist is foreseen in the standard for the Blu-ray disc. In these alternative embodiments, the suggestion server 9 still receives feedback for updating the database 14,28.

In yet another embodiment, the method of FIG. 3 is implemented entirely on the client device 2, using a collection of auxiliary content data items stored thereon, or on a medium inserted into the read/write unit 6. This might be the case in an implementation in a suite of video editing software, for example.

The databases 14,28 need not necessarily comprise a single table configured in the manner illustrated herein.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. 'Computer programme' is to be understood to mean any software product stored on a computer-readable medium, such as an optical disk, downloadable via a network, such as the Internet, or marketable in any other manner.

The invention claimed is:

1. A method of suggesting to a user auxiliary content data items for forming accompaniment tracks for synchronised rendering with content data items, including:
   obtaining user-provided input data descriptive of a content data item;
   accessing a database including records, each configured to associate descriptive data with a respective auxiliary content data item for forming an accompaniment track;
   based on said user-provided input data and said records, suggesting at least one of the auxiliary content data items to the user;
   receiving data representative of a selection by the user of one of said suggested auxiliary content data items; and
   amending a database record for the selected auxiliary content data item so as to associate at least part of the user-provided input data with the selected auxiliary content data item.

2. The method according to claim 1 where the descriptive data includes tags and where amendment of the database record for the selected auxiliary content data item includes amending statistics stored in association with at least one of the tags.

3. The method according to claim 1 including:
   receiving data representative of a selection of a sub-section of the selected auxiliary content data item; and
   amending a record in the database associated with the selected auxiliary content data item so as to indicate the selection of the sub-section.

4. The method according to claim 1, including:
   forming a database query based at least partly on the input data;
   causing the database query to be resolved; and
   receiving the data representative of the selection of an auxiliary content data item in response to presenting a plurality of auxiliary content data items for selection based on results of the database query.

5. A method of obtaining an accompaniment track for rendering in synchrony with a content data item, including:
   forming a query based at least partly on data describing the content data item;
   submitting the query to a system for searching a database, the database including records, each configured to associate descriptive data with a respective auxiliary content data item for forming an accompaniment track;
   based on said query and said records, suggesting at least one of the auxiliary content data items to a user;
   receiving data representative of a selection by the user of one of said suggested auxiliary content data items;
   amending a database record for the selected auxiliary content data item so as to associate at least part of the data describing the content data item with the selected auxiliary content data item; and
   obtaining data representative of the selected auxiliary content data item for forming the accompaniment track.

6. The method according to claim 5 including receiving information identifying a plurality of auxiliary content data items in response to submitting the query and suggesting said plurality of auxiliary content data items to said user.

7. The method according to claim 5 where:
the query is formed at least partly on the basis of data indicative of a duration of at least part of the content data item, when rendered; and
the query is submitted to a system for searching a database associating data representative of at least one duration with each of a plurality of the auxiliary content data items.

8. The method according to claim 5 including forming the accompaniment track by selecting a sub-section of the auxiliary content data item selected in association with the query.

9. The method according to claim 5 where the query is based at least partly on data describing first and second content data items.

10. The method according to claim 5 where:
the query is formed on the basis of the data describing the content data item and on additional information; and
the query is submitted to a system for searching a database including records associating auxiliary content data items with information of types corresponding to that of the content data item and the additional information.

11. The method according to claim 10 where:
the additional information includes data identifying at least one of a user and a type of user; and
the additional information is retrieved from a database associating information of a corresponding type with at least one profile of at least one user.

12. The method according to claim 5 where, based on said query and said records, a plurality of the auxiliary content items are suggested to the user.

13. A system comprising a program stored in a non-transitory computer-readable memory for effecting performance of a method of suggesting auxiliary content data items for forming accompaniment tracks for synchronised rendering with content data items, including:
receiving input data descriptive of a content data item;
accessing a database including records, each record being configured to associate descriptive data with a respective auxiliary content data item for forming an accompaniment track;
based on said input data and said records, suggesting at least one of the auxiliary content data items;
receiving data representative of a selection of one of said suggested auxiliary content data items; and
amending a database record for the selected auxiliary content data item so as to associate at least part of the input data with the selected auxiliary content data item.

14. A system according to claim 13 where, based on said input data and said records, a plurality of the auxiliary content data items are suggested.

15. A computer program embodied in a non-transitory computer-readable medium for effecting the performance of a method of suggesting to a user auxiliary content data items for forming accompaniment tracks for synchronised rendering with content data items, including:
obtaining user-provided input data descriptive of a content data item;
accessing a database including records, each configured to associate descriptive data with a respective auxiliary content data item for forming an accompaniment track;
based on said user-provided input data and said records, suggesting at least one of the auxiliary content data items to the user;
receiving data representative of a selection by the user of one of said suggested auxiliary content data items; and
amending a database record for the selected auxiliary content data item so as to associate at least part of the user-provided input data with the selected auxiliary content data item.

16. A method of obtaining an audio accompaniment track for rendering in synchrony with an image content data item, including:
forming a query based at least partly on data describing the image content data item;
submitting the query to a system for searching a database, the database including records, each configured to associate descriptive data with a respective auxiliary content data item for forming an audio accompaniment track;
based on said query and said records, suggesting at least one of the auxiliary content data items to a user;
receiving data representative of a selection by the user of one of the suggested auxiliary content data items;
amending a database record for the selected auxiliary content data item so as to associate at least part of the data describing the image content data item with the selected auxiliary content data item; and
obtaining data representative of the selected auxiliary content data item for forming the audio accompaniment track.

17. A method of suggesting to a user auxiliary content data items for forming audio accompaniment tracks for synchronised rendering with image content data items, including:
obtaining user-provided input data descriptive of an image content data item;
accessing a database including records, each configured to associate descriptive data with a respective auxiliary content data item for forming an audio accompaniment track;
based on said user-provided input data and said records, suggesting at least one of the auxiliary content data items to the user;
receiving data representative of a selection by the user of one of said suggested auxiliary content data items; and
amending a database record for the selected auxiliary content data item so as to associate at least part of the user-provided input data with the selected auxiliary content data item.

* * * * *